(No Model.)

J. A. FELT.
VALVE.

No. 260,858. Patented July 11, 1882.

UNITED STATES PATENT OFFICE.

JOHN A. FELT, OF KENT, OHIO.

VALVE.

SPECIFICATION forming part of Letters Patent No. 260,858, dated July 11, 1882.

Application filed November 7, 1881. (No model.)

*To all whom it may concern:*

Be it known that I, JOHN A. FELT, of Kent, Portage county, Ohio, have invented a new and useful Improvement in Valves, of which the following is a specification.

My invention consists of a valve in which the valve-stem and valve-operating stem are connected by screw-threads, the operating-stem having an annular shoulder or flange, which is pressed upward against the inclosing-shell to form a steam-tight joint by a spiral spring on the operating-stem above the joint, the spring being in the hub of the wheel by which the valve-operating stem is turned, and compressed between an inner annular flange of the lower end of the hub and a screw-cap on the upper end of the valve-operating stem.

Figure 1:
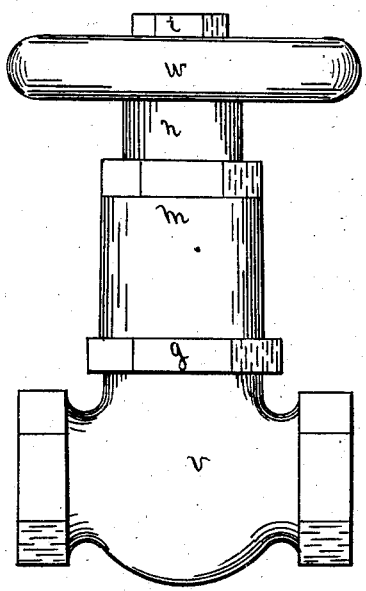
Figure 2:
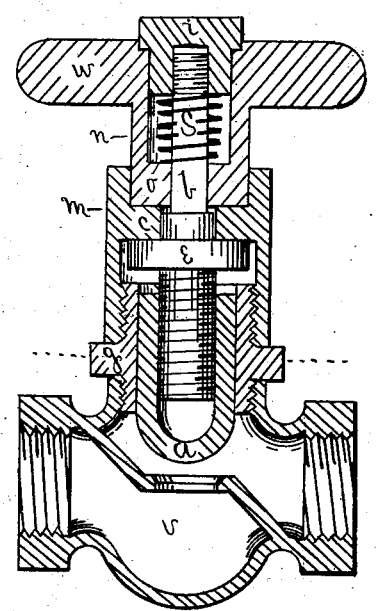
Figure 3:
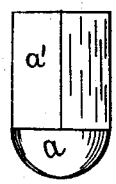
Figure 4:
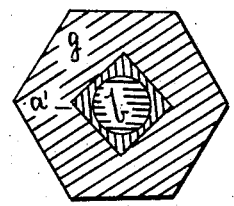

In the drawings, Figure 1 is an elevation. Fig. 2 is a vertical section. Fig. 3 represents the valve-stem. Fig. 4 is a cross-section at the dotted line in Fig. 2.

The valve $a$ has an angular stem, $a'$, which is fitted to slide in an angular opening through guide-nut $g$ to prevent the valve from turning. Stem $a'$ is threaded internally to receive the screw-threaded end of the operating-stem $b$. The shell $m$, connected by screw-threads to guide-nut $g$, has an internal annular flange, $c$, which loosely fits stem $b$. The annular flange $e$ on stem $b$ is pressed upward against flange $c$ by spring $s$ to form a steam-tight joint. The operating-stem $b$ is turned to open and close valve $a$ by wheel $w$, whose hub $n$ enters the upper end of shell $m$ and rests on flange $c$. Hub $n$ is hollow, and contains spring $s$ and cap $i$. The lower end of hub $n$ is loosely fitted to stem $b$, and forms an internal flange or seat, $o$, on which spring $s$ rests. Stem $b$ is angular where it is loosely fitted to seat $o$, and also somewhat below the seat, that it may be turned by wheel $w$ and have slight vertical movement to compensate for wear of flanges $e c$. Cap $i$ is screwed on the upper end of stem $b$, and loosely fits in wheel $w$. Spring $s$, by pressing upward against cap $i$, constantly holds up stem $b$, with its flange $e$, in contact with flange $c$, and thereby prevents steam or water from escaping upward into the cavity in hub $n$, which contains spring $s$. The tension or pressure of spring $s$ may be regulated by turning cap $i$ on the screw-threaded upper end of stem $b$.

If preferred, instead of being made angular, valve-stem $a'$ may be feathered to guide-nut $g$, and stem $b$ feathered to hub $n$.

I claim as my invention—

The valve $a$, having an angular stem, $a'$, screw-threaded to receive the screw-threaded end of the valve-operating stem $b$, in combination with the valve-casing $v$, guide-nut $g$, shell $m$, having an internal flange or annular enlargement, $c$, valve-operating stem $b$, having the flange or enlargement $e$, the wheel $w$, having the hub $n$, with its lower end forming a seat, $o$, for spring $s$, and fitted loosely to an angular part of stem $b$, cap $i$, and spring $s$, bearing against the cap to press flange $e$ against flange $c$, substantially as described.

JOHN A. FELT.

Witnesses:
 BRADFORD HOWLAND,
 GEO. F. ROBINSON.